United States Patent [19]
Pudleiner et al.

[11] Patent Number: 6,022,939
[45] Date of Patent: Feb. 8, 2000

[54] THERMOPLASTIC POLYURETHANES WITH IMPROVED MELT FLOW

[75] Inventors: Heinz Pudleiner, Krefeld; Hans-Georg Hoppe, Leichlingen; Joachim Wagner, Köln, all of Germany

[73] Assignee: Bayer Aktiengesellschaft, Leverkusen, Germany

[21] Appl. No.: 09/244,381

[22] Filed: Feb. 4, 1999

Related U.S. Application Data

[63] Continuation of application No. 08/823,738, Mar. 25, 1997, abandoned, which is a continuation-in-part of application No. 08/572,433, Dec. 14, 1995, abandoned.

[30] Foreign Application Priority Data

Dec. 23, 1994 [DE] Germany ................... 4446332

[51] Int. Cl.$^7$ ................................. C08G 18/65
[52] U.S. Cl. ............................. 528/79; 528/85
[58] Field of Search ..................... 528/79, 85

[56] References Cited

U.S. PATENT DOCUMENTS

| | | | |
|---|---|---|---|
| 3,078,257 | 2/1963 | Rinke et al. | 260/77.5 |
| 3,379,683 | 4/1968 | Booth | 528/64 |
| 3,494,894 | 2/1970 | Urgest | 528/64 |
| 4,086,214 | 4/1978 | Cardy | 528/59 |
| 4,245,081 | 1/1981 | Quiring et al. | 528/65 |
| 4,371,684 | 2/1983 | Quiring et al. | 528/65 |

FOREIGN PATENT DOCUMENTS

| | | |
|---|---|---|
| 2025010 | 3/1991 | Canada . |
| 0080031 | 6/1983 | European Pat. Off. . |
| 0556758 | 12/1993 | European Pat. Off. . |
| 3072516 | 3/1991 | Japan . |
| 843796 | 8/1960 | United Kingdom . |
| 1024381 | 3/1966 | United Kingdom . |

OTHER PUBLICATIONS

Kunstsoffe 68 (month unavailable) 1978, pp. 819–825.
Kautschuk, Gummi, Kunstoffe 35, (month unavailable) 1982, pp. 568–584.
Chem. Abstracts, vol. 89, No. 14, Oct. 2, 1978, Abstract #111952u, Sakagucki et al, "Polyurethane Elastomers" p. 123.

*Primary Examiner*—Rachel Gorr
*Attorney, Agent, or Firm*—Joseph C. Gil; Aron Preis

[57] ABSTRACT

A thermoplastic polyurethane elastomer is disclosed obtained by reacting
A) diisocyanates,
B) polyhydroxy compounds and/or polyamines, with
C) as chain extenders mixtures of
    C1) benzene substituted with at least two hydroxyalkyl, hydroxyalkoxy, aminoalkyl and/or aminoalkoxy groups and
    C2) an alkanediol with 4 to 44 C atoms. The reaction is further characterized in that the molar ratio C1 to C2=60 to 40 to 95 to 5 and in that the equivalent ratio of NCO groups to the sum of the NCO-reactive groups is about 0.9 to 1.20.

8 Claims, No Drawings

THERMOPLASTIC POLYURETHANES WITH IMPROVED MELT FLOW

CROSS REFERENCE TO RELATED APPLICATION

This is a continuation of U.S. Ser. No. 08/823,738, filed Mar. 25, 1997 which was continuation-in-part of U.S. Ser. No. 08/572,433, filed Dec. 14, 1995, both abandoned.

BACKGROUND OF THE INVENTION

The invention relates to thermoplastic polyurethane elastomers with improved processing behavior.

Thermoplastic polyurethane elastomers (TPU's) have long been known. They are of technical importance because of the combination of high-quality mechanical properties with the known advantages of inexpensive thermoplastic processibility. A large range of variation of mechanical properties can be achieved by the use of different chemical components. A survey on TPU's, their properties and applications is given e.g. in Kunststoffe 68 (1978), pages 819 to 825 and in Kautschuk, Gummi, Kunststoffe 35 (1982), pages 568 to 584.

TPU's are built up from linear polyols, usually polyesters or polyethers, organic diisocyanates and short-chain diols (chain extenders). They can be prepared continuously or discontinuously. The so-called belt process and the extruder process, as the best-known preparative processes, are also used industrially.

For adjustment of the properties, the components can be varied within relatively wide molar ratios. Molar ratios of polyols to chain extenders of 1:1 to 1:12 have proven effective. By these means, products having Shore hardness values in the range of 70 A to 75 D may be obtained.

For improvement of the processing behavior—particularly in the case of products for processing by extrusion—increased stability and an adjustable melt flow are of great interest. This depends on the chemical and morphological structure of the TPU's.

The structure necessary for an improved processing behavior is achieved in products manufactured by conventional processes only by the use of mixtures of chain extenders, e.g. 1,4-butanediol/1,6-hexanediol. As a result of this, the arrangement of the rigid segments is so greatly distorted that not only is the melt flow improved, but simultaneously the thermomechanical properties, e.g. tensile strength and resistance to thermal distortion, are distinctly impaired.

Thermoplastic polyurethane elastomers with aromatic alkoxy-glycols, e.g., 1,4-bis(2-hydroxyethoxy)benzene, as chain extenders are distinguished by high deflection temperature, high elasticity, and low compression set and tensile set; their processing behavior, on the other hand, is unsatisfactory as a result essentially of a non-uniform melt flow.

DE-OS 2,817,456 describes the manufacture of thermoplastic polyurethanes from linear polyols, organic diisocyanates and a mixture of two glycols as chain extenders. The homogeneity and freedom from gel of the products manufactured e.g. in an extruder are certainly pointed out, but so also is the disadvantageous lowering of the range of softening temperatures.

The melt flow of TPU's is often adjusted by addition of mono-functional compounds as chain terminating agents which impose an upper limit on the molecular weight of the polymer. Polymers of especially high molecular weight cannot be prepared in this way.

The invention provides thermoplastic polyurethane elastomers that have been obtained by reaction of
A) diisocyanates,
B) polyhydroxy compounds and/or polyamines, with
C) as chain extender, a mixture of
  C1) benzene substituted with at least two substituents selected from the group consisting of hydroxyalkyl, hydroxyalkoxy, aminoalkyl and aminoalkoxy moieties, and
  C2) an alkanediol with 4 to 44 C atoms wherein molar ratio C1/C2=60 to 40 to 95 to 5.

The melt flow of these TPU's may be adjusted by the nature and amount of the chain extender C2 without significant change of the mechanical and thermal properties of the product. The addition of monofunctional compounds as chain terminating agents is optional, but not necessary for the adjustment of the melt flow. The products melt homogeneously, are free from nodules and swollen matter, have improved extrusion properties, and may be produced in reaction extruders.

Conventional catalysts that accelerate the formation of polyurethane, for example, tertiary amines or organic metal compounds, can be used in the preparation of the polyurethane elastomers according to the invention. It is also possible, for limiting the molecular weight, to use as chain terminating agents small amounts of monofunctional compounds, preferably 0.01 to 7 equivalent %, based on the NCO content of component A). Conventional additives, including waxes, phenolic antioxidants and UV absorbers can likewise be used, in amounts of 0.1 to 3 wt. %, relative to the weight of the TPU.

The substituted benzenes, C1), are preferably those having two identical substituents, more preferably, the substituents are in the 1,4-positions. These substituents preferably have either a terminal hydroxyl group or a terminal amino group, contain alkyl or alkylene groups with 1 to 4 carbon atoms and may be bound to the benzene ring via oxygen (alkoxy) or directly (alkyl). Particularly preferred compounds correspond to the formula

wherein
X and Y independently, denote OH or $NH_2$,

| | |
|---|---|
| Alk | an alkylene group with 1 to 4 carbon atoms, |
| W | a single chemical bond or an oxygen atom and |
| Ph | is a benzene ring. |

Examples are 1,4-bis(2-hydroxyethoxy)benzene, 1,3-bis(2-hydroxyethoxy)benzene, 1,2-bis(2-hydroxyethoxy)benzene, 1,4-bis(hydroxymethyl)benzene and 1,2 bis(hydroxymethyl)benzene. Specifically excluded from the scope of C1) is xylylene-diamine.

The alkanediols C2) have 4 to 44, preferably 4 to 20, carbon atoms. Examples include 1,4-butanediol, 1,6-hexanediol, 1,8-octanediol, 1,10-decanediol and 1,12-dodecanediol. Specifically excluded from the scope of the chain extending mixture is the mixture of bis(hydroxythoxy)enzene and 1,4 butanediol.

The molar ratio of C1) to C2) is 60 to 40 to 95 to 5, preferably 75 to 25 to 90 to 10.

Diisocyanates include aliphatic, cycloaliphatic, araliphatic, heterocyclic and aromatic diisocyanates. Examples are aliphatic diisocyanates, such as hexamethylene diisocyanate, cycloaliphatic diisocyanates, such as isophorone diisocyanate, 1,4-cyclohexane diisocyanate, 1-methyl-2,4- and -2,6-cyclohexane diisocyanate as well as the corresponding isomer mixtures, 4,4'-, 2,4'- and 2,2'-dicyclohexyl-methane diisocyanate as well as the corresponding isomer mixtures and preferably aromatic diisocyanates, such as 2,4-tolylene diisocyanate, mixtures of 2,4- and 2,6-tolylene diisocyanate, 4,4'-, 2,4'- and 2,2'-diphenylmethane diisocyanate, mixtures of 2,4'- and 4,4'-diphenylmethane diisocyanate, urethane-modified liquid 4,4'- and/or 2,4'-diphenylmethane diisocyanates, 4,4'-diisocyanatodiphenylethane-(1,2) and 1,5-naphthylene diisocyanate. Diisocyanates preferably used are 1,6-hexamethylene diisocyanate, dicyclohexylmethane diisocyanate, isophorone diisocyanate, diphenylmethane diisocyanate isomer mixtures with a 4,4'-diphenylmethane diisocyanate content of greater than 96 wt. % and in particular 4,4'-diphenylmethane diisocyanate and 1,5-naphthylene diisocyanate.

To the diisocyanates there may be added up to 15% of polyiso-cyanates, based on the molar amount of the diisocyanate, but not more than still allows the polymer to be processed thermoplastically. Examples of polyisocyanates are triphenylmethane4,4',4''-triisocyanate and polyphenylpolymethylene polyisocyanates.

Essentially linear polyols, polyesters, polyethers, polycarbonates or mixtures thereof can be used as polyhydroxy compounds B).

Suitable polyether polyols can be prepared by reacting one or more alkylene oxides with 2 to 4 carbon atoms in the alkylene group with a starter molecule that contains two combined active hydrogen atoms. The following, for example, may be mentioned as alkylene oxides: ethylene oxide, 1,2-propylene oxide, epichlorohydrin and 1,2- and 2,3-butylene oxides. Preferably, ethylene oxide, propylene oxide and mixtures of 1,2-propylene oxide and ethylene oxide are used. The alkylene oxides can be used individually, alternating in succession, or as mixtures. To be considered as starter molecules are for example: water, aminoalcohols, such as N-alkyldiethanolamines, for example N-methyl-diethanolamine, and diols, such as ethylene glycol, 1,3-propylene glycol, 1,4-butanediol and 1,6-hexanediol. Optionally, mixtures of starter molecules can also be used. Further suitable polyether polyols are the hydroxyl-group-containing polymerization products of tetrahydrofuran.

The essentially linear polyether polyols preferably have a number average molecular weight of 500 to 5000. A single polyether polyol or a mixture of two or more such polyols may be used.

Suitable polyester polyols may be prepared for example from dicarboxylic acids with 2 to 12 carbon atoms, preferably 4 to 6 carbon atoms, and polyhydric alcohols. To be considered as dicarboxylic acids are for example: aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids can be used individually or as mixtures, e.g. in the form of a mixture of succinic, glutaric and adipic acids. For the preparation of the polyesterols it can, if necessary, be advantageous to use, instead of the dicarboxylic acids, the corresponding dicarboxylic acid derivatives, such as carboxylic acid diesters with 1 to 4 carbon atoms in the alcohol group, carboxylic acid anhydrides or carboxylic acid chlorides. Examples of polyhydric alcohols are glycols with 2 to 10, preferably 2 to 6, carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol. The polyhydric alcohols may be used singularly or as mixtures of two or more alcohols.

Esters of carbonic acid with the named diols, furthermore, are suitable, especially those with 4 to 8 carbon atoms, such as 1,4-butanediol and/or 1,8-hexanediol, condensation products of ω-hydroxy-carboxylic acids, for example ω-hydroxycaproic acid and preferably polymerization products of lactones, for example optionally substituted ω-caprolactones.

Preferably used as polyester polyols are ethanediol-polyadipate, 1,4-butanediol-polyadipate, ethanediol-butanediol-1,4-polyadipate, 1,6-hexanediol-neopentylglycol-polyadipate, 1,6-hexanediol-1,4-butanediol-polyadipate and polycaprolactones.

The polyesterols have number average molecular weights of 500 to 5000.

Commercial amine-terminated polyethers, such as are known, e.g., under the trademark Jeffamines® of Texaco Chemical Co., may be used as polyamines B). These contain ethylene oxide, propylene oxide or tetramethylene oxide as repeating unit and have a number average molecular weight of 400 to 8000.

Among the preferred embodiments, a mixture of 90 to 75 mole-% of 1,4-bis(2-hydroxyethoxy)benzene and 10 to 25 mole-% of one or more members selected from the group consisting of 1,4-butanediol, 1,6-hexanediol, 1,8-octanediol, 1,10-decanediol and 1,12-dodecanediol may be used as chain extender.

The alkanediols C2) may contain up to 15% (relative to the molar amount of the chain extenders mixture $C_1+C_2$) of a triol with a molecular weight of up to 500. Examples are glycerol, trimethylolpropane and their alkylene oxide adducts as well as 1,2,6-hexanetriol.

Suitable catalysts which accelerate in particular the reaction between the NCO groups of the diisocyanates and the hydroxyl groups of the structural components are the tertiary amines, known and conventional according to the prior art, such as, e.g., triethylamine, dimethylcyclohexylamine, N-methylmorpholine, N,N'-dimethylpiperazine, 2-(dimethylaminoethoxy)ethanol, diazabicyclo(2,2,2)octane and the like as well as in particular organic metal compounds such as titanic acid esters, iron compounds, tin compounds, e.g. tin diacetate, tin dioctoate, tin dilaurate or the tin dialkyl salts of aliphatic carboxylic acids, such as dibutyltin diacetate, dibutyltin dilaurate or the like. The catalysts are usually used in quantities of 0.0005 to 0.1 parts per 100 parts of polyhydroxy compound.

Chain terminating agents may be used in quantities of 0.01 to 7 equivalent-%, based on the NCO group content of component A). Preferably no chain terminating agent is used.

0.1 to 3 wt. % (based on the total amount of all components) of waxes, antioxidants and/or UV absorbers may also be used as additives. Preferably mixtures of stabilizers are used.

Conventional antioxidants (cf. EP-A 12 343) may be used for this purpose. Antioxidants based on stearically hindered phenols, e.g., 2,6-di-tert-butyl-4-methylphenol and pentaerythrityltetrakis-3-(3,5-di-tert-butyl4-hydroxyphenyl) propionate (Irganox® 1010 of the Ciba Geigy Company) are preferred.

In addition, auxiliary agents and/or additives may be included in the composition of the TPU. Examples include lubricants, inhibitors, stabilizers against hydrolysis, light, heat and discoloration, flameproofing agents, dyes, pigments, inorganic and/or organic fillers and reinforcing agents.

Reinforcing agents are in particular fibrous reinforcing materials, such as, e.g., inorganic fibers, that are manufactured according to the prior art and may also be treated with a size.

More detailed information on the aforementioned auxiliary substances and additives may be found in the technical literature, for example, in the monograph by J. H. Saunders and K. C. Frisch "High Polymers", Volume XVI, Polyurethanes, Parts 1 and 2, Interscience Publishers 1962 and 1964 respectively and in DE-A 2,901,774.

For the preparation of the TPU, the structural components, optionally in the presence of catalysts, auxiliary substances and/or additives, are caused to react in such proportions that the equivalent ratio of NCO groups to the sum of the NCO-reactive groups, in particular the OH groups, of the structural components, amounts to 0.9:1 to 1.20:1, preferably 0.95:1 to 1.10:1.

The known mixing plants, preferably those operating with high shearing energy, are suitable for the manufacture of TPU's. For continuous manufacture, co-kneaders, preferably extruders, such as, e.g., twin-shaft extruders and Buss kneaders, as well as the mixing head/belt process, may be mentioned.

The TPU according to the invention may be manufactured in a twin-shaft extruder e.g. by making the prepolymer in the first section of the extruder and adding the polyol addition and chain extension in the second section. Alternatively, the components of the prepolymer may be mixed outside the extruder in a mixing head or nozzle, and the prepolymer reaction then carried out in the first section and the aforementioned subsequent stages in the second section of the extruder. Moreover, the whole prepolymer stage may also be carried out before the extruder. The prepolymer prepared is then dosed with the polyol and the remaining chain extender into the extruder.

In another embodiment, a preadduct is prepared from polyol and diisocyanate in a tank, and the chain extension mixture added to the preadduct. The mixture is then agitated at 210 to 240° C. until the reaction is completed.

According to the invention, chain extender mixtures are used in which the distance between the functional hydroxyl groups of the diol C2) which react with isocyanate groups is coordinated with the substituted benzene C1). Freer flowing thermoplastic polyurethanes are obtained if the chain length of the diol does not "match" the benzene derivative, i.e., if it is either too short or too long. Through a correct choice, therefore, high-molecular TPU can be prepared without a chain transfer agent and good melt flow nevertheless guaranteed.

The thermoplastic polyurethanes according to the invention have a melt flow that is adjustable via the chain length of the diol C2). Thus, for example with 1,4-bis(2-hydroxyethoxy)benzene as C1) and 1,6-hexanediol or 1,12-dodecanediol as C2), lower-melting products are obtained, while with 1,8-octanediol somewhat less readily melting products are obtained.

The thermoplastic polyurethanes according to the invention have excellent mechanical properties. The values of strain at break are always above 450% and, in most cases exceed 600%. The plastic strain after stretching of the sample to 200% is very low and independent of the co-chain extender used. For applications in which strips or films are extended, this is a particularly important property, since the molded article returns almost to its original dimensions.

The thermoplastic polyurethanes according to the invention have as principal advantage a very high heat deflection temperature, measured as softening point in the thermomechanical analysis (TMA). The heat deflection temperature is retained even with optimized melt flow.

The thermoplastically processible polyurethanes according to the invention may be used to prepare injection molded articles, fibre and coating compound, but particularly as extrudate. In the case of extruded products, such as, for example, films, the thermoplastic polyurethane according to the invention results in an improved melt flow with essentially the same other properties.

In the following examples the results of melt volume index (MVI) measurements are reported as a function of temperature and are a measure of the melt flow according to the invention. The heat deflection temperature of the samples was determined by thermomechanical analysis (TMA; intersection of tangents method).

The invention is further illustrated but is intended to be limited by the following examples in which all parts and percentages are by weight unless otherwise specified.

EXAMPLES

Preparation: Prepolymer Process

The polyether polytetrahydrofuran (molecular weight-number average about 2000) is provided in a flat-flange flask with stirrer and reflux condenser and dehydrated at 120° C. and 14 mbar for 1 hour. Then dibutyltin dilaurate as catalyst and bis-(4-isocyanatophenyl)methane (MDI) are added and the mixture is stirred at 120° C. and 14 mbar for 1 hour. After about 1 hour, the particular calculated content of free NCO groups is reached. Ethylenebis(stearylamide) and ionol are dissolved in the melt and the corresponding amount of chain extender is added. After brief homogenization (ca. 1 min), the reaction mixture is poured out into Teflon pans and post-annealed for about 12 hours at 100° C. Table 1 gives details.

TABLE 1

|  | Polytetrahydrofuran (B) | MDI (A) (moles) | Aliphatic diol (C2) | 1,2-Bis(2-hydroxy-ethoxy)benzene (C1) |
|---|---|---|---|---|
| Example 1 | 1 mole | 2.97 | 1,4-Butanediol, 0.24 mole | 1.57 mole |
| Example 2 | 1 mole | 2.95 | 1,6-Hexanediol, 0.24 mole | 1.57 mole |
| Example 3 | 1 mole | 2.93 | 1,8-Octanediol, 0.23 mole | 1.56 mole |
| Example 4 | 1 mole | 2.92 | 1,10-Dodecane-diol, 0.23 mole | 1.55 mole |

TABLE 1-continued

|  | Polytetrahydrofuran (B) | MDI (A) (moles) | Aliphatic diol (C2) | 1,2-Bis(2-hydroxy-ethoxy)benzene (C1) |
|---|---|---|---|---|
| Example 5 | 1 mole | 2.90 | 1,12-Dodecane-diol, 0.23 mole | 1.54 mole |

Composition of the examples
Characteristic quantities: Soft segment content 65% (calculated as fraction of macrodiol in the sum of macrodiol, diisocyanate and chain extender)
NCO/OH ratio: 105
chain extender mixture content: 13 mole %

TABLE 2

| | Mechanical and thermal measurement data: | | | | | | |
|---|---|---|---|---|---|---|---|
| | MVI (210° C.)/ cm$^3$/10 min | MVI (220° C.)/ cm$^3$/10 min | MVI (230° C.)/ cm$^3$/10 min | Softening point/° C. | Tensile strength/ MPa | Strain at break/% | Plastic strain after 200% strain/% |
| Example 1 | 20 | 137 | 204 | 175 | 25.5 | 650 | 37 |
| Example 2 | 9 | 37 | 130 | 180 | 49.8 | 575 | 37 |
| Example 3 | 5 | 22 | 104 | 185 | 53.1 | 550 | 40 |
| Example 4 | 10 | 47 | 196 | 181 | 40.7 | 600 | 38 |
| Example 5 | 11 | 61 | 266 | 175 | 27.9 | 685 | 41 |

The clear dependence of the melt flow on the carbon chain of the chain extender C2) is observed in the examples. At the same time it is observed that the tensile strength becomes a maximum with a chain extender C2) optimally adapted to the chain extender C1). The strain at break, plastic strain and—particularly remarkable and surprising—the resistance to thermal distortion, measured as softening point in the thermomechanical analysis (TMA) behave largely independently of the adaptation of the chain extender C1) and C2). Precisely, the combination of high resistance to thermal distortion and low plastic strain with the possibility of adjustment of the melt flow distinguishes the thermoplastic polyurethane according to the invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic polyurethane elastomer prepared by reacting in the melt
   A) at least one diisocyanate, and
   B) at least one member selected from the group consisting of polyhydroxy compounds and polyamines having a number average molecular weight of about 500 to 10,000, and
   C) a chain extending mixture of
      C1) benzene substituted with at least two substituents selected from the group consisting of hydroxyalkyl, hydroxyalkoxy, aminoalkyl and aminoalkoxy moieties, excluding m-xylylenediamine and
      C2) an alkanediol with 4 to 44 carbon atoms, wherein molar ratio of C1:C2=60:40 to 95:5 and wherein the equivalent ratio of NCO groups to the sum of the NCO-reactive groups is about 0.9 to 1.20, said chain extending mixture excluding a mixture of bis (hydroxyethoxy)benzene and 1,4 butanediol.

2. The thermoplastic polyurethane elastomers of claim 1, wherein said C1) has two identical substituents in the 1 and 4 positions.

3. The thermoplastic elastomer of claim 1 wherein said C1) corresponds to

X-Alk-W-Ph-W-Alk-Y, wherein
   X and Y independently denote OH or $NH_2$, and
   Alk denotes an alkylene group with 1 to 4 carbon atoms, and
   W denotes a single chemical bond or an oxygen atom and
   Ph denotes a benzene ring.

4. The thermoplastic polyurethane elastomer of claim 1, wherein C1 is 1,4-bis(2-hydroxyethoxy)benzene.

5. A thermoplastic polyurethane elastomer prepared by reacting in the melt
   A) at least one diisocyanate, and
   B) at least one member selected from the group consisting of polyhydroxy compounds and polyamines having a number average molecular weight of about 500 to 10,000, and
   C) a chain extending mixture of
      C1) a compound corresponding to X-Alk-W-Ph-W-Alk-Y, wherein
      X denotes OH, Y denotes $NH_2$, Alk denotes an alkylene group with 1 to 4 carbon atoms, W denotes a single chemical bond or an oxygen atom and Ph denotes a benzene ring, and
      C2) an alkanediol with 4 to 44 carbon atoms, wherein molar ratio of C1:C2=60:40 to 95:5 and wherein the equivalent ratio of NCO groups to the sum of the NCO-reactive groups is about 0.9 to 1.20.

6. A thermoplastic polyurethane elastomer prepared by reacting in the melt
   A) at least one diisocyanate, and
   B) at least one member selected from the group consisting of polyhydroxy compounds and polyamines having a number average molecular weight of about 500 to 10,000, and C) a chain extending mixture of
- C1) benzene substituted with at least two substituents selected from the group consisting of hydroxyalkyl, hydroxyalkoxy, aminoalkyl and aminoalkoxy moieties, excluding m-xylylenediamine and
- C2) an alkanediol with 4 to 44 carbon atoms, wherein molar ratio of C1:C2=60:40 to 95:5 and wherein equivalent ratio of NCO groups to the sum of the NCO-reactive groups is about 0.95 to 1.10 and wherein a mixture of bis(hydroxyethoxy)benzene and 1,4 butanediol is excluded.

7. A thermoplastic polyurethane elastomer prepared by reacting in the melt

A) at least one diisocyanate, and

B) at least one member selected from the group consisting of polyhydroxy compounds and polyamines having a number average molecular weight of about 500 to 10,000, and C) a chain extending mixture of
- C1) at least one member selected from the group consisting of 1,4-bis(2-hydroxyethoxy)benzene, 1,3-bis(2-hydroxyethoxy)benzene, 1,2-bis(2-hydroxyethoxy)benzene, 1,4-bis(hydroxymethyl)benzene and 1,2 bis(hydroxymethyl)-benzene and
- C2) at least one member selected from the group consisting of 1,4-butanediol, 1,6-hexanediol, 1,8-octanediol, 1,10-decanediol and 1,12-dodecanediol, wherein molar ratio of C1:C2=60:40 to 95:5 and wherein the equivalent ratio of NCO groups to the sum of the NCO-reactive groups is about 0.9 to 1.20 and wherein a mixture of bis(hydroxyethoxy)benzene and 1,4 butanediol is excluded.

8. A thermoplastic polyurethane elastomer prepared by reacting in the melt

A) at least one diisocyanate, and

B) at least one member selected from the group consisting of polyhydroxy compounds and polyamines having a number average molecular weight of about 500 to 10,000, and C) a chain extending mixture of
- C1) benzene substituted with at least two substituents selected from the group consisting of hydroxyalkyl, hydroxyalkoxy, aminoalkyl and aminoalkoxy moieties, and
- C2) an alkanediol with 4 to 44 carbon atoms, wherein molar ratio of C1:C2=75:25 to 90:10 and wherein the equivalent ratio of NCO groups to the sum of the NCO-reactive groups is about 0.9 to 1.20 and wherein a mixture of bis-(hydroxyethoxy)-benzene and 1,4-butanediol is excluded.

* * * * *